United States Patent [19]

Minette

[11] Patent Number: 5,091,644
[45] Date of Patent: Feb. 25, 1992

[54] METHOD FOR ANALYZING FORMATION DATA FROM A FORMATION EVALUATION MWD LOGGING TOOL

[75] Inventor: Daniel C. Minette, Madison, Conn.
[73] Assignee: Teleco Oilfield Services Inc., Meriden, Conn.
[21] Appl. No.: 642,319
[22] Filed: Jan. 15, 1991
[51] Int. Cl.$^5$ .............................................. G01V 5/12
[52] U.S. Cl. ................................ 250/254; 250/262; 250/264; 250/269; 250/266
[58] Field of Search .............. 250/254, 264, 265, 266, 250/262, 269

[56] References Cited

U.S. PATENT DOCUMENTS 4,705,944 10/1987 Coope .................................. 250/254
5,017,778 5/1991 Wraight .............................. 250/254

Primary Examiner—Carolyn E. Fields
Attorney, Agent, or Firm—Fishman, Dionne & Cantor

[57] ABSTRACT

This invention relates to a method for analyzing data from a measurement-while-drilling (MWD) formation evaluation logging tool which compensates for rotations of the logging tool (along with the rest of the drillstring) during measurement periods. In accordance with this method, the received signal is broken down into a plurality of sections. In a preferred embodiment, the present invention calls for the breaking of the signal from the formation into four different sections: top, bottom, right, left. As the tool rotates, it will quickly pass through these four quadrants. Each time it passes a boundary, a counter is incremented, pointing to the next quadrant. This will allow for dividing the data into four spectra for each detector. Each of these four spectra will be obtained for ¼th of the total acquisition time. The relative error is minimized by comparing the relative error in each spectrum and selecting a specific spectrum or by combining at least two spectra. In a gamma ray density tool having a pair of detector assemblies (e.g., long space and short space), the long space data, as well as the short space data, will have sufficient statistical significance for use in the measurment of the density. In this manner, four compensated density measurements can be obtained for each sample. These four measurements can be compared and combined to obtain an optimum density, and pseudo-caliper measurement.

12 Claims, 12 Drawing Sheets

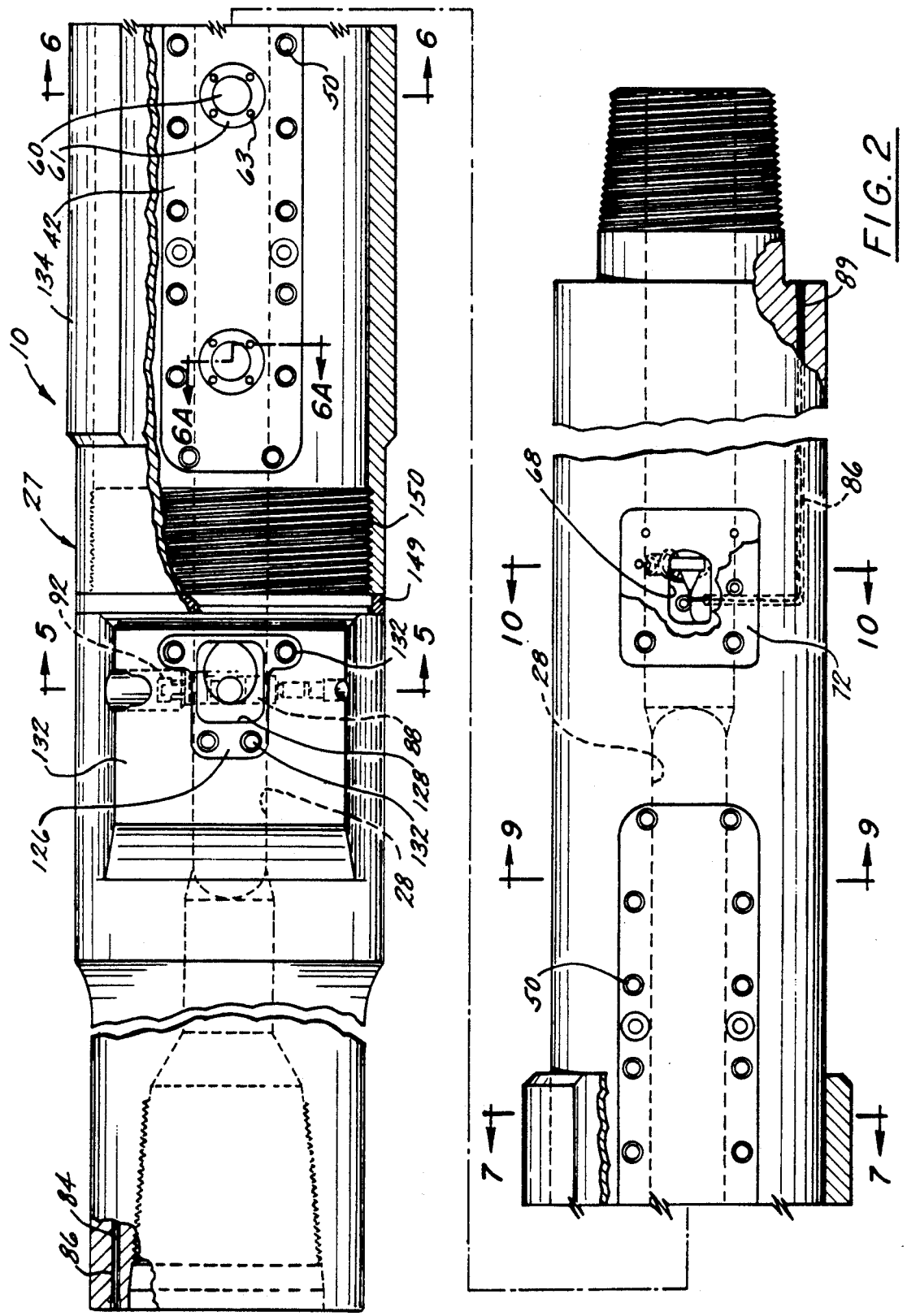

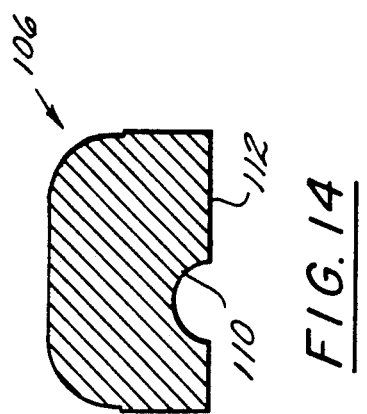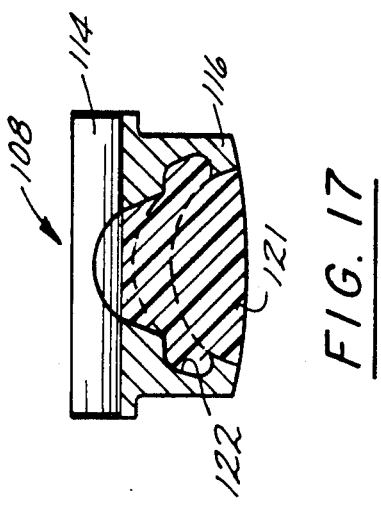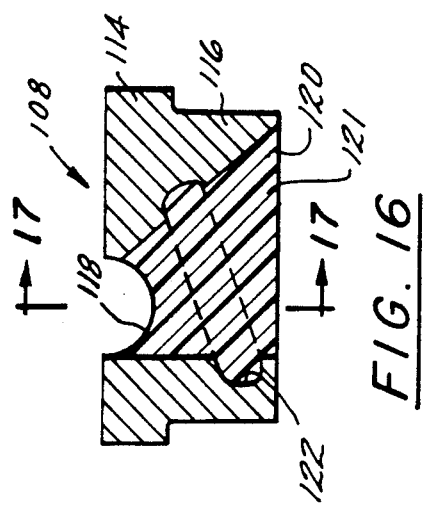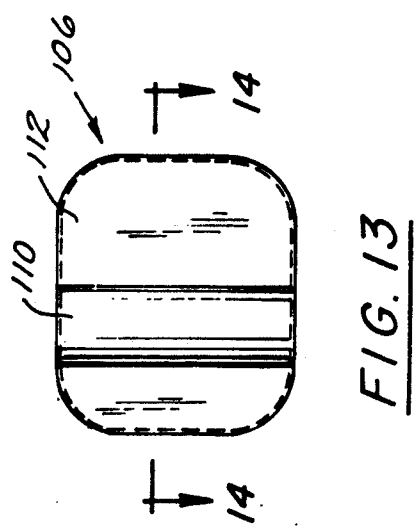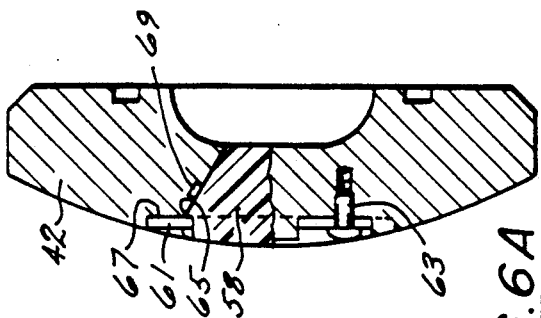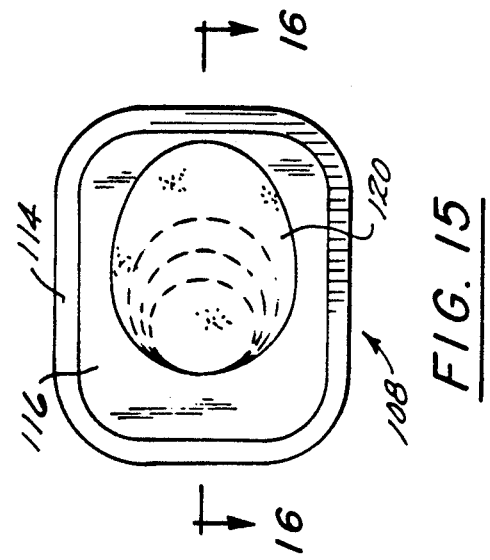

METHOD FOR ANALYZING FORMATION DATA FROM A FORMATION EVALUATION MWD LOGGING TOOL

CROSS-REFERENCE TO RELATED APPLICATION

This application is related to the following applications, all of which are begin filed contemporaneously with this application:

(1) U.S. application Ser. No. 642,320 filed Jan. 15, 1991 entitled "Radiation Detector Assembly for Formation Logging Apparatus", invented by Edward Marino, Robert F. Robinson and Nabil Mishriky;

(2) U.S. application Ser. No. 641,744 filed Jan. 15, 1991 entitled "A Method for Analyzing Formation Data from a Formation Evaluation MWD Logging Tool", invented by Daniel C. Minette and Allen Duckworth; and (3) U.S. application Ser. No. 642,314 filed Jan. 15, 1991 entitled "Formation Density Logging MWD Apparatus", invented by Carl A. Perry and Guy A. Daigle.

BACKGROUND OF THE INVENTION

This invention relates generally to borehole logging apparatus and methods for performing nuclear radiation based measurements. More particularly, this invention relates to a new and improved apparatus for effecting formation density logging in real time using gamma rays wherein the improved nuclear logging apparatus comprises a measurement-while-drilling (MWD) tool.

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable (which is attached to some sort of mobile laboratory at the surface) is also the means by which information is sent up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually contains some type of source (nuclear, acoustic, or electrical) which transmits energy into the formation as well as a suitable receiver for detecting the same energy returning from the formation. The present invention relates to logging apparatus for measuring the density of the formation wherein the source emits nuclear energy, and more particularly gamma rays. Wireline gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

Examples of prior art wireline density devices are disclosed in U.S. Pat. Nos. 3,202,822, 3,321,625, 3,846,631 3,858,037, 3,864,569 and 4,628,202. Wireline formation evaluation tools such as the aforementioned gamma ray density tools have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the recently developing art of measurement-while-drilling (MWD) in which many of the characteristics of the formation are determined substantially contemporaneously with the drilling of the borehole. Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation. Examples of MWD density devices are disclosed in U.S. Pat. Nos. 4,596,926, 4,814,609 and 4,829,176.

There is a continuing need for new and improved MWD density tools which overcome the limitation associated with both known wireline and MWD density measurement devices. For example, improvements are perceived in achieving more accurate and reliable measurements notwithstanding backscattering of gamma rays through the tool and the presence of drilling fluid (mud) between the tool's detectors and nuclear source and the formation.

SUMMARY OF THE INVENTION

The above-discussed and other problems and deficiencies of the prior art are overcome or alleviated by the measurement-while-drilling (MWD) density logging tool of the present invention. In accordance with the present invention, a MWD formation density sub is provided which incorporates a single gamma ray source and a pair of longitudinally displaced and mutually aligned detector assemblies (i.e., dual scintillation counters). A nuclear source is mounted in a pocket in the sub wall and partially surrounded by gamma ray shielding. The subwall section adjacent the source is expanded radially so as to define a lobe which displaces mud thus reducing borehole and mudcake effects. In an alternative embodiment, the lobe is replaced with a threaded-on fluid displacement sleeve as described below. The two detector assemblies are mounted within a cavity or hatch formed in the subwall and enclosed by a detector hatch cover under ambient pressure. The detector assemblies are fixedly spaced from the source and are also partially surrounded by gamma ray shielding to provide good formation response. The hatch cover is secured to the sub by bolts and contains radiation transparent windows therethrough in alignment with the detector assemblies.

The density sub may include an off-center bore therethrough for internal flow of drilling fluid. In addition to the hatch for housing the detector assemblies, the sub includes two additional equi-spaced hatches for holding additional control electronics and a power supply.

A threaded-on fluid displacement sleeve is positioned on the sub and over the detector hatch cover. In an alternative embodiment of this invention discussed above, the lobe is removed from adjacent the source; and the fluid displacement sleeve extends over the source port. This sleeve has several important functions including the displacement of borehole fluids, reducing mudcaking which might have an adverse effect on the measurement and maintaining a relatively constant formation to detector distance. The sleeve is full gage (with respect to the borehole diameter) and includes radiation transparent windows that are positioned over the hatch cover windows in a manner which optimizes the response of the tool. The sleeve includes blades which are configured so as to provide adequate flow area for drilling fluids flowing through the annulus between the density sub and formation wall; and yet reduce to a minimum the amount of drilling mud between the source and detector assemblies on the one hand and the formation on the other. These blades are hard faced with wear resistant material. The threading and shoulders of the sleeves are configured so as to adequately secure the sleeve to the subwall without rotation (known as "make-up") while drilling. The sleeve may be replaced at the drilling site when worn or damaged.

The two gamma ray detector assemblies employ a sodium iodide crystal and glass phototube; and are each housed in a novel mounting arrangement which provides appropriate gama ray shielding as well as protection from shock and vibration. The actual crystal is mounted in a hermetically sealed housing using standard techniques. The outer configuration of the housing allows for rigid attachment to a magnetic shield housing (mu metal). This shield provides magnetic protection for the phototube so as to avoid undesired disturbances in the tube output signal during operation. A layer of elastomeric material provided with voids for volumetric expansion is interposed between the crystal housing and the magnetic shield housing. The magnetic shield housing also serves as a structural member by protecting the glass phototube from external forces such as those created by volumetric expansion of the elastomer under elevated temperature conditions. An outer insulating tube is then ruggedly secured to one end of the mumetal housing by an adhesive. This tube, in combination with a protective end cap, serves to "close in" and environmentally protect the dynode electronics assembly required for phototube operation. As mentioned, the phototube and electronics within the magnetic shield housing are suitably encapsulated within the insulating tube so as to protect them from environmental damage, particularly from shock and vibration. The optical path between the crystal and phototube is created using a transparent medium. The entire detector package described thus far is encapsulated in a potting compound (i.e., an elastomer), which has a specified geometry using a construction of molded ribs to give the desired rigidity and vibration characteristics. This technique creates a small, rugged package, which can then be inserted into a hatch in the density tool sub wall without resorting to standard fasteners for mounting.

Unlike a conventional wireline density sonde, the MWD density tool of this invention will typically be used in conjunction with rotary drilling and will therefore be rotated (along with the rest of the drillstring) during measurement periods. As a result, there is a need to account for such rotations when evaluating the gamma ray measurements. In a first embodiment of this invention, a method known as "quadrature" is used. Quadrature is the breaking of the signal from the formation into four different sections: top, bottom, right, left. As the tool rotates, it will quickly pass through these four quadrants. Each time it passes a boundary, a counter is incremented, pointing to the next quadrant. This will allow for dividing the data into four spectra for each detector. Each of these four spectra will be obtained for $\frac{1}{4}$th of the total acquisition time. The long space data, as well as the short space data, will have sufficient statistical significance for use in the measurement of the density. In this manner, four compensated density measurements can be obtained for each sample. These four measurements can be compared and combined to obtain an optimum density, and pseudo-caliper measurement. If the borehole suffers minimal washout, all four compensated density measurements could be used in the calculation of the true density. If the borehole suffers more extensive washouts, the bottom and the two side measurements could be used to calculate true density. If the borehole suffers extreme washout, only the bottom measurement would be used. Of course, this same technique is equally applicable a system which breaks down the signal into less than four or greater than four sections.

In a second embodiment of this invention, the density measurement is combined with the measurement from a borehole caliper, preferably an acoustic caliper. The acoustic caliper can continuously measure the standoff as the tool is rotating around the borehole. If the caliper is aligned with the density source and detectors, it can determine the standoff in front of the detectors at any given time. This information can be used to separate the density data into a number of bins based on the amount of standoff. After a pre-set time interval, the density measurement can then be made. The first step in this process is for short space and long space densities to be calculated from the data in each bin. Then, these density measurements can be combined in a manner that minimizes the total error in the density calculation. Minimizing the errors in the density calculation requires the consideration of two main error sources: statistical fluctuations in the count rates and the increased uncertainty in the measurements associated with increased standoff. The magnitude of the statistical uncertainty is proportional to the square root of the inverse of the acquisition time. The increase in uncertainty with standoff is tool dependent and must be calculated for every tool.

The above-discussed and other features and advantages of the present invention will be appreciated and understood by those of ordinary skill in the art from the following detailed description and drawings.

DESCRIPTION OF THE DRAWINGS

Referring now to the drawings, wherein like elements are numbered alike in the several FIGURES:

FIG. 2 is a side elevation view, partly in cross section, of the nuclear logging tool in accordance with the present invention;

FIG. 6A is a cross sectional elevation view along the line 6A—6A of FIG. 2, only depicting the detector hatch cover;

FIG. 13 is a plan view of the lower source shielding;

FIG. 14 is a cross sectional elevation view along the line 14—14 of FIG. 13;

FIG. 15 is a top plan view depicting the upper source shielding;

FIG. 16 is a cross sectional elevation view along the line 16—16 of FIG. 15;

FIG. 17 is a cross sectional elevation view along the line 17—17 of FIG. 16;

DESCRIPTION OF THE PREFERRED EMBODIMENT

Figure 1:
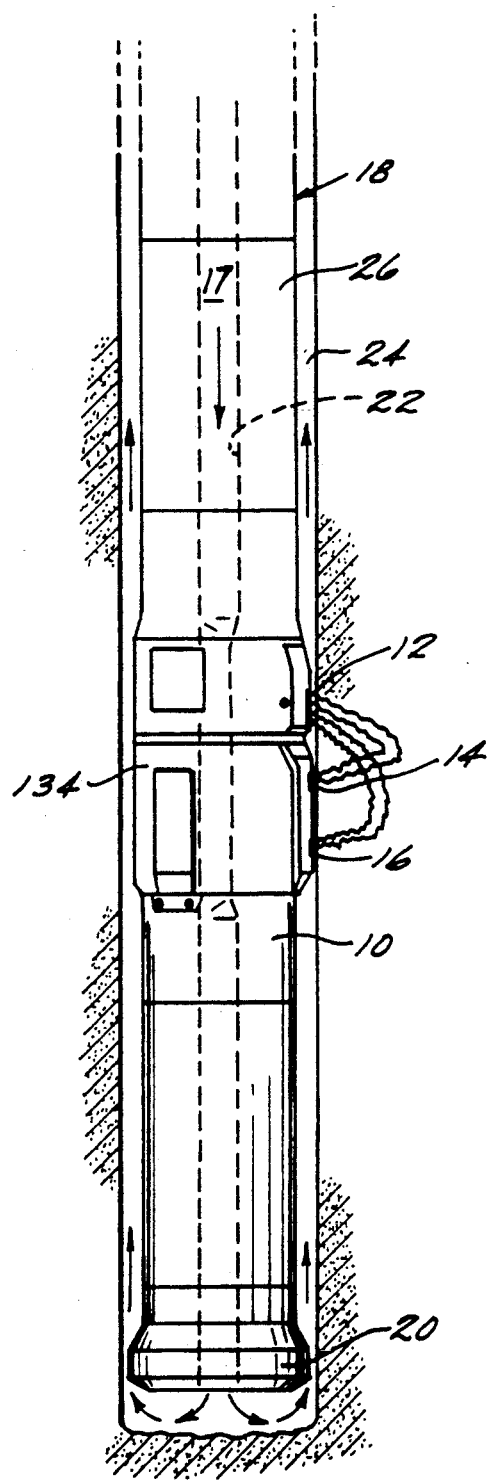
FIG. 1 is a diagrammatic view of a gamma-ray density tool in accordance with the present invention.

Referring first to FIG. 1, a diagram of the basic components for a gamma-ray density tool 10 in accordance with the present invention is shown. This tool comprises a drill collar which contains a gamma-ray source 12 and two spaced gamma-ray detector assemblies 14 and 16. All three components are placed along a single axis that has been located parallel to the axis of the tool. The detector 14 closest to the gamma-ray source will be referred to as the "short space detector" and the one farthest away (16) is referred to as the "long space detector". As will be discussed hereinafter, gamma-ray shielding is located between detector assemblies 14, 16 and source 12. Windows open up to the formation from both the detector assemblies and the source. A layer of drilling fluid (mud) is present between th formation and the detector assemblies and source.

The tool 10 is placed into service by loading it with a sealed chemical source (typically cesium 137) and lowering it into a formation. Gamma-rays are continuously emitted by the source and these propagate out into the formation.

Two physical processes dominate the scattering and absorption of gamma rays at the energies used in density tools. They are Compton scattering and photoelectric absorption. The macroscopic Compton scattering cross section (i.e., probability of scattering while passing through a set thickness of material) is proportional to the electron density in the formation and is weakly dependent on the energy of the incident gamma ray (it falls fairly slowly with increasing energy). Since the electron density is, for most formations, approximately proportional to the bulk density, the Compton cross section is proportional to the density of the formation. The macroscopic photoelectric absorption cross section Pe is also proportional to the electron density. Unlike the Compton cross section, it is strongly dependent on the energy of the incident gamma rays and on the materials in the formation (the lithology).

Formation density is determined by measuring the attenuation of gamma rays through the formation. As will be discussed in more detail hereinafter, the shielding in the tool minimizes the flux of gamma rays straight through the tool. This flux can be viewed as background noise for the formation signal. The windows (in the detector hatch cover and fluid displacement sleeve 134) increase the number of gamma rays going from the source to the formation and from the formation to the detectors. The layer of mud between the tool and the formation is minimized by the use of "in gauge" sleeve 134. After the mud layer is minimized, the density measurements made by the two detectors are combined to form a compensated measurement.

As mentioned, the compensation for the mud standoff is usually accomplished through the use of two detectors: a short space and a long space detector. Since gamma rays travel through more of the formation to reach the long space detector than they do to reach the short space detector, the long space detector shows a significantly larger count rate change for a given change in formation density. This allows for the compensation using the two detector responses and a "rib" algorithm. The rib function, allows for the calculation of compensation (which should be equal to the difference between the true and the measured long space density), as a function of the difference between the short and long space densities.

Still referring to FIG. 1, tool 10 is preferably associated with a measurement-while-drilling (MWD) system and comprises a sub section of a drillstring 18 which terminates at a drill bit 20. Drillstring 18 has an open internal diameter 22 in which drilling mud 17 flows from the surface, through the drillstring and out of the drill bit. Drill cuttings produced by the operation of drill bit 20 are carried away by a mud stream rising up through the free annular space 24 between the drillstring and the wall of the well. The mud column in drillstring 18 may also serve as the transmission medium for carrying signals of downhole parameters to the surface. This signal transmission is accomplished by the well known technique of mud pulse generation whereby pressure pulses are generated in the mud column in drillstring 18 representative of sensed parameters down the well. The drilling parameters are sensed in a sensor unit in a drill collar 26 near or adjacent to the drill bit. Pressure pulses are established in the mud stream within drillstring 18, and these pressure pulses are received by a pressure transducer and then transmitted to a signal receiving unit which may record, display and/or perform computations on the signals to provide information of various conditions down the well. The method and apparatus for this mud pulse telemetry is described in more detail in U.S. Pat. Nos. 3,982,431, 4,013,945 and 4,021,774, all of which are assigned to the assignee hereof and fully incorporated herein by reference.

Figure 12:
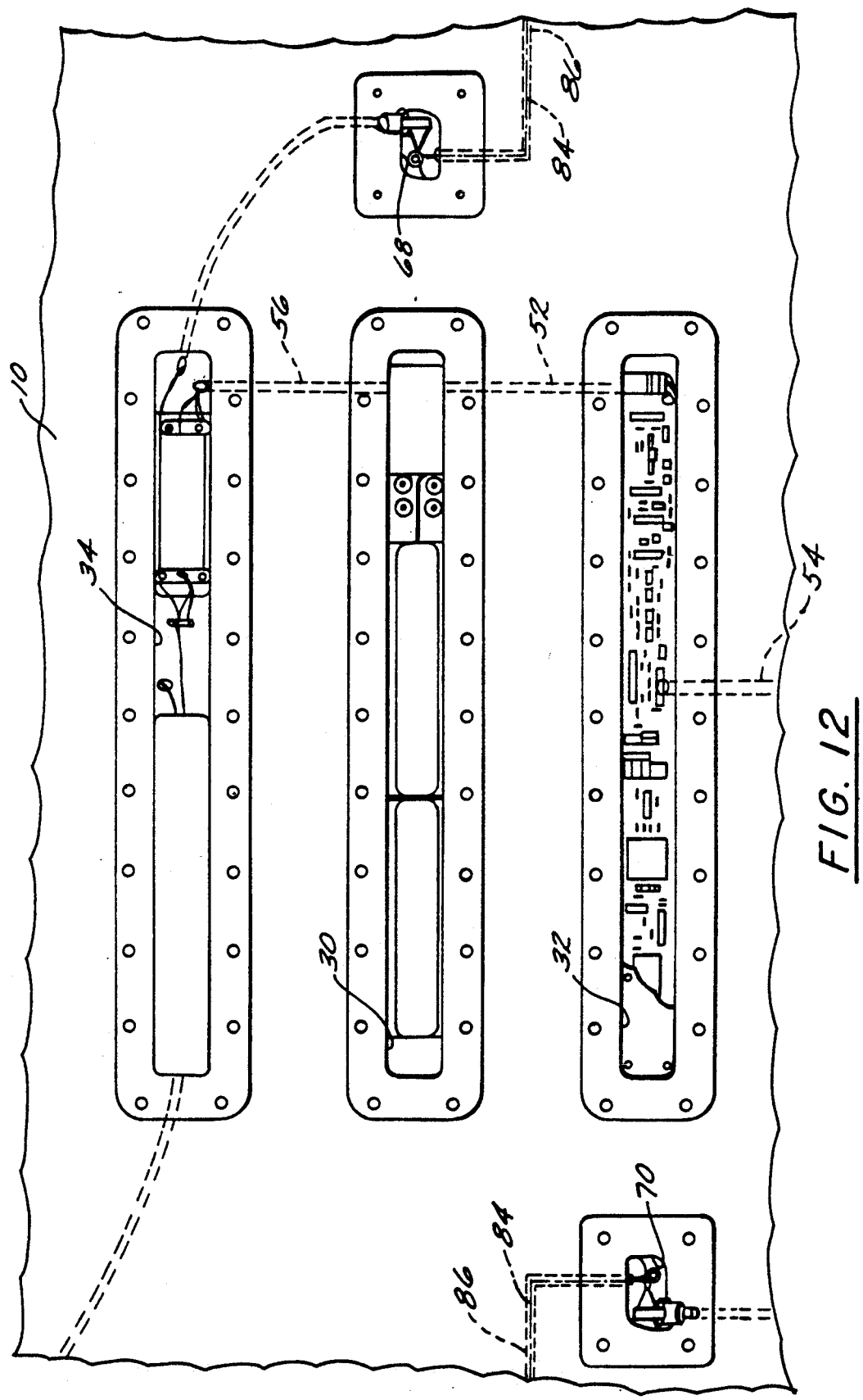
FIG. 12 is a plan view of the detector, processing and MTI hatches of the tool of FIG. 2 with the hatch covers being removed and with the circumference of the tool being shown in a single plane.
Figure 18:
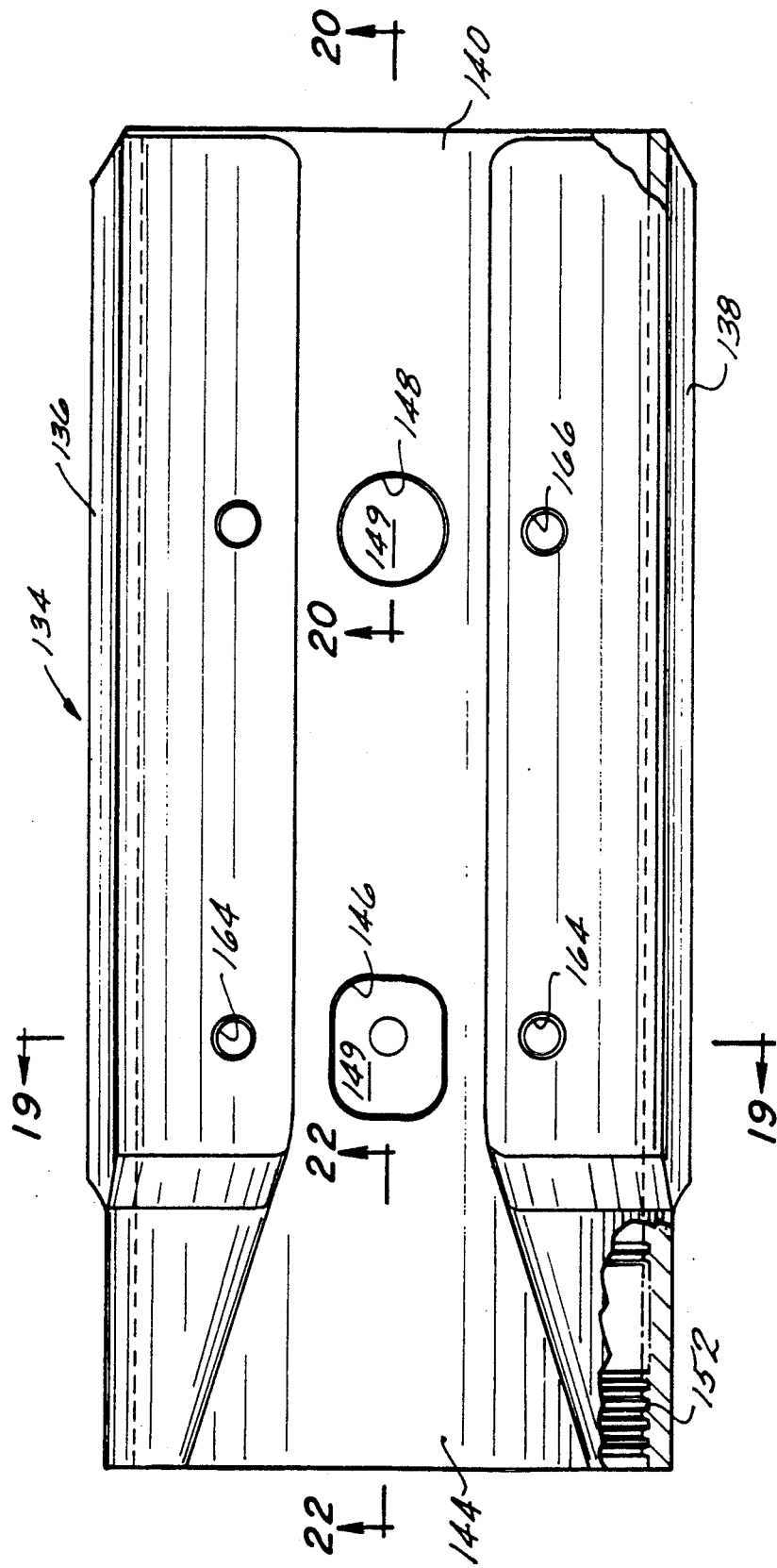
FIG. 18 is a side elevation view of a fluid displacement sleeve in accordance with the present invention.
Figure 20:
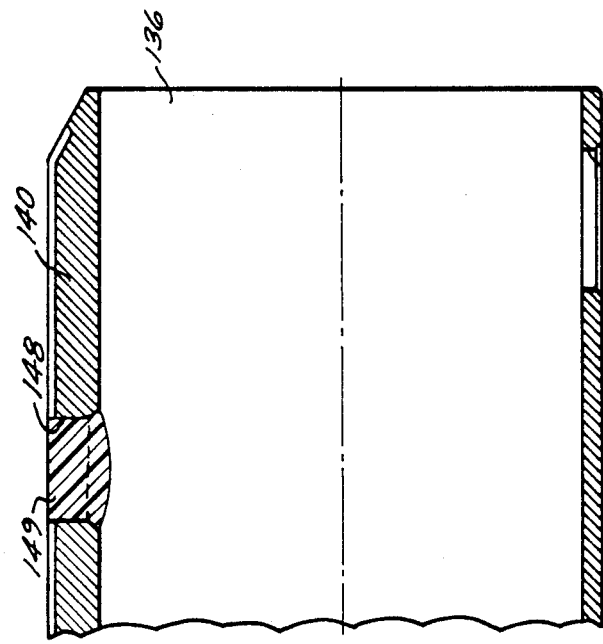
FIG. 20 is a cross sectional elevation view along the line 20—20 of FIG. 18.
Figure 21:
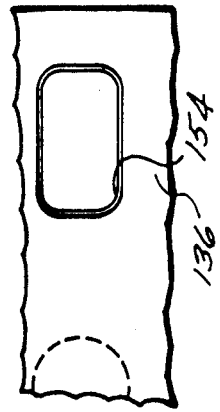
FIG. 21 is a plan view along the line 21—21 of FIG. 20.

Referring now to FIGS. 2-12, the nuclear logging tool of this invention is shown generally at 10 in FIG. 2. It will be appreciated that FIG. 12 is a depiction of an entire circumference of the central portion of tool 10 shown in a single plane. The tool comprises a steel drill collar sub 27 having a longitudinal opening a bore 28 along the length thereof. Opening 28 is axial (i.e., concentric to the tool) only at the two ends (in the area of the "pin" and "box" connectors). In the remaining central portion of sub 27, bore 28 may be offset with respect to the central vertical axis of the tool. This offset bore provides room for a deep source opening as will be described hereinafter. Such an offset may be necessary in smaller diameter tools such as 6¾ inches and may not be needed in larger diameter tools such as 7¾ inches and larger sizes.

In general, the construction of sub 27 is quite similar to the construction of the sub used for the neutron porosity tool described in U.S. patent application Ser. Nos. 510,082; 511,537; 511,538 and 513,953, all of which were filed Apr. 14, 1990, are assigned to the assignee hereof and fully incorporated herein by reference. More particularly, the descriptions under the sub-headings in the aforementioned patent applications entitled "Tool Construction and Mounting of Electronic Components and Detectors" and "Tool Power and Communications Bus and Modular Tool Interface Hatch Electronics" are equally applicable to the density tool 10 of this invention. While these previously filed applications should be referred to for detailed explanations of these common features, a brief description will now follow for ease of understanding.

Figure 6:
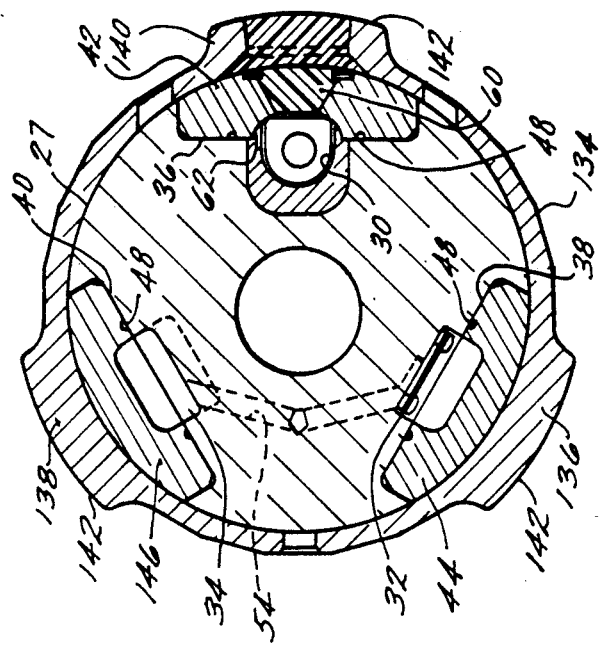
FIG. 6 is a cross sectional elevation view along the line 6—6 of FIG. 2.
Figure 8:
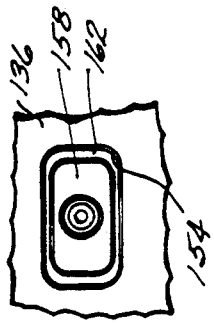
FIG. 8 is an elevational view along the line 8—8 of FIG. 7.
Figure 7:
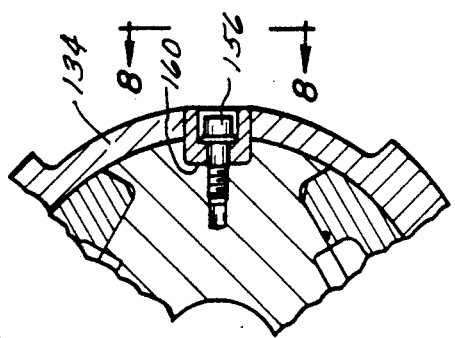
FIG. 7 is a partial sectional elevation view along the line 7—7 of FIG. 2.

As best shown in FIGS. 6 and 12, sub 27 includes three equispaced chambers or hatches 30, 32 and 34 for housing the tool electronics and detectors. Hatch 30 will be referred to as the "detector" hatch; hatch 32 will be referred to as the "Processing" hatch and hatch 34 will be referred to as the "modular tool interface" or "MTI" hatch. The hatches 30, 32, 34 are machined pockets and each includes a precision surface 36, 38 and 40 to permit the formation of a high pressure seal with a hatch cover 42, 44 and 46, respectively (with the hatch covers being removed in FIG. 12). A groove is provided in each hatch cover 42, 44 and 46 for receiving a suitable high pressure sealing means such as O-ring 48. It will be appreciated that each surface 36, 38 and 40 acts both as a drilling fluid sealing surface as well as a load bearing surface for each respective hatch cover. As shown in FIG. 2, each hatch cover 42, 44 and 46 is secured to a respective surface 36, 38 and 40 by high tensile strength, corrosion resistant bolts 50 of sufficient size and number (preferably 22) to maintain seal integrity over a wide range of downhole conditions including pressure, temperature, torsion and bending. Hatch 30 is interconnected with hatch 32 by a passageway 52 through the subwall 27. Similarly, hatch 32 is connected to hatch 34 by a passageway 54 and hatch 34 is connected to hatch 30 by a passageway 56 (see FIG. 12).

Hatch cover 42 includes a pair of spaced openings 58 and 60 (see FIGS. 2, 6 and 6A) therethrough which are aligned with each detector assembly 14 and 16 (see FIG. 12). Each opening 58, 60 communicates with a flattened U-shaped channel 62 running longitudinally along the interior surface of hatch cover 42. Within each opening 58, 60 is a radiation transparent window 64, 66 comprised of a high strength, low Z material. A preferred material for windows 64, 66 is berylium. The high strength is required in view of the large pressure drop across the windows (since the detector assemblies 12, 14 within hatch 30 will be at ambient pressure). Each window 64, 66 is cone shaped and radiates or diverges outwardly from detector assemblies 12, 14 at an angle which maximizes gamma-ray detection. Preferably, that angle is about 60 degrees.

With reference to FIGS. 2 and 6A, each window 58, 60 is retained in hatch cover 42 by a ring 61 and four threaded bolts 63. Each window 58, 60 includes, a shoulder 65 which is coextensive with a recess 67 in hatch cover 42. Ring 61 thus abuts up against both shoulder 65 and recess 67 so as to firmly engage each window within the hatch cover. An O-ring 69 provides a fluid tight seal between the window 58 and hatch cover 42.

Figure 2A:
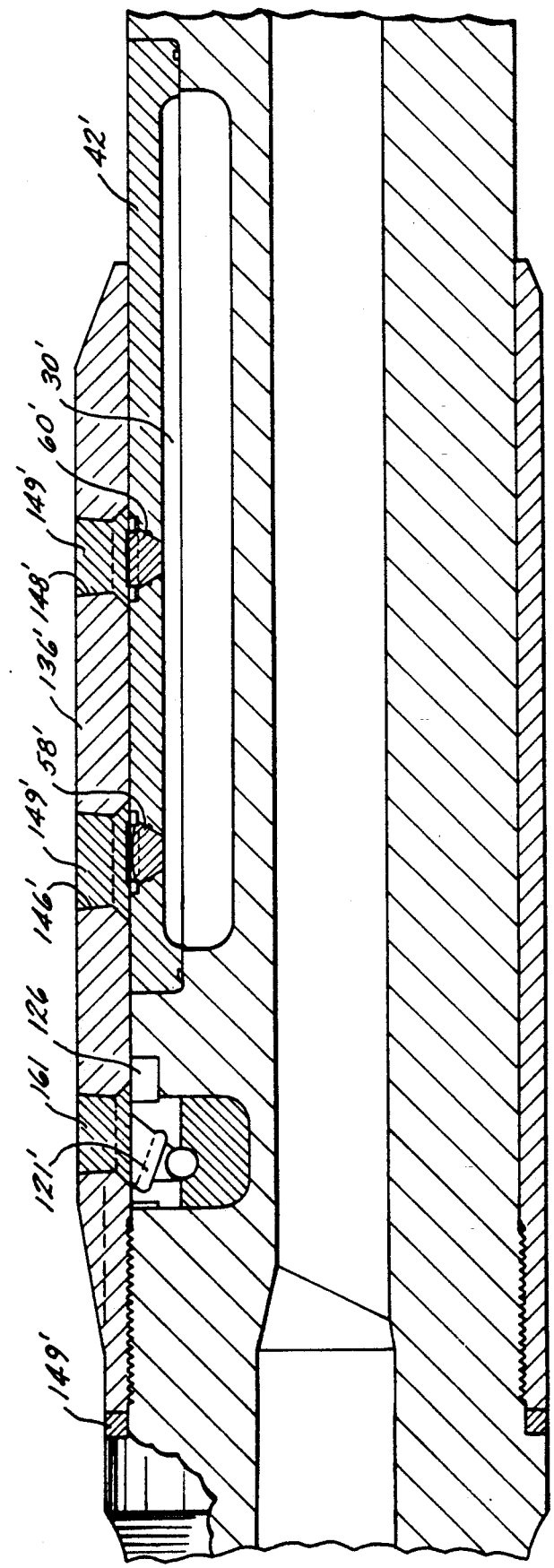
FIG. 2A is a cross-sectional elevation view depicting a nuclear logging tool similar to the tool of FIG. 2, but utilizing a modified fluid displacement sleeve.
Figure 3:
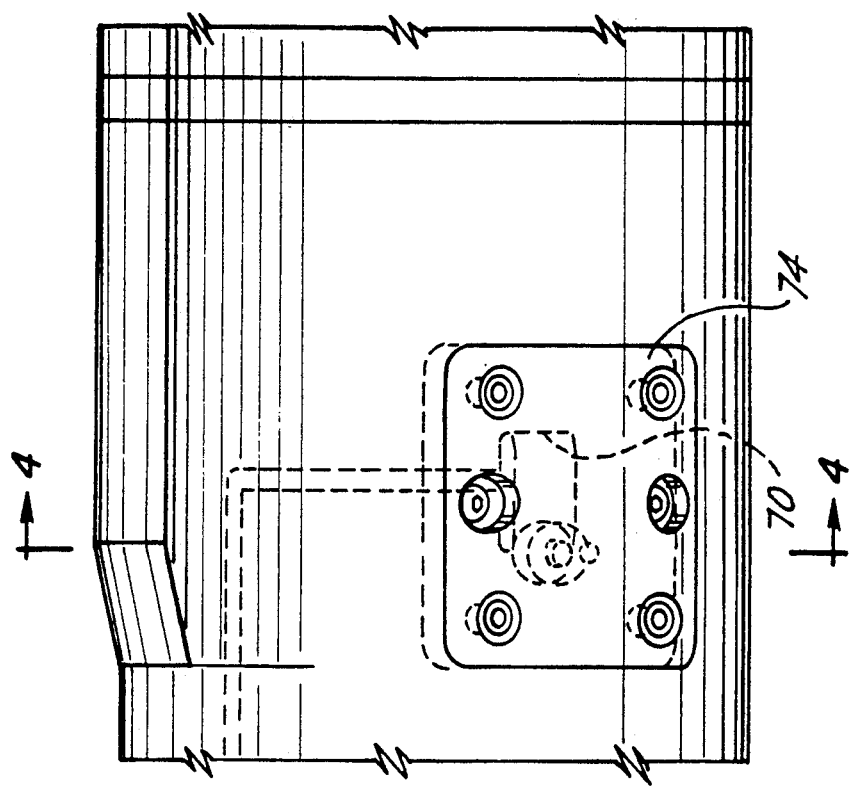
FIG. 3 is an enlarged view of a modular connector junction hatch in the tool of FIG. 2.
Figure 4:
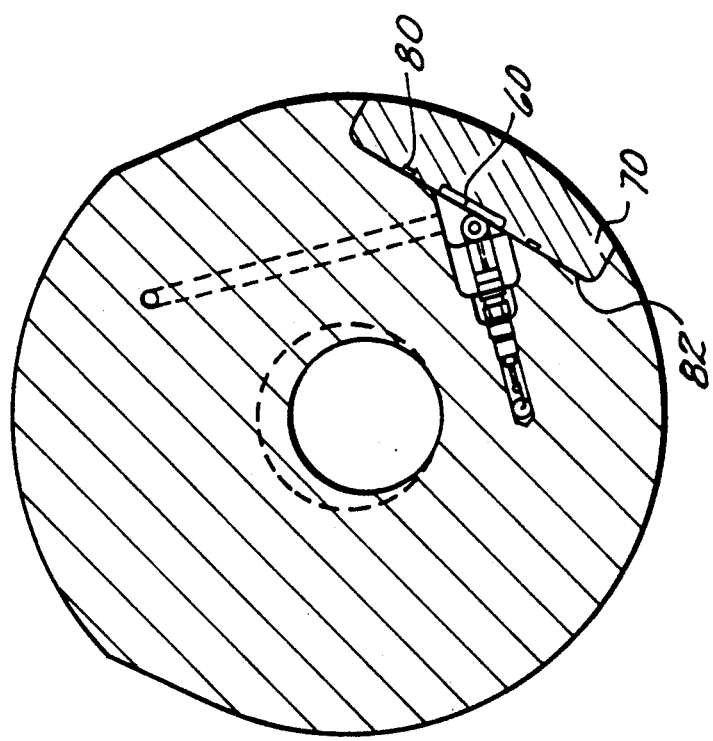
FIG. 4 is a cross sectional elevation view along the line 4—4 of FIG. 3.
Figure 10:
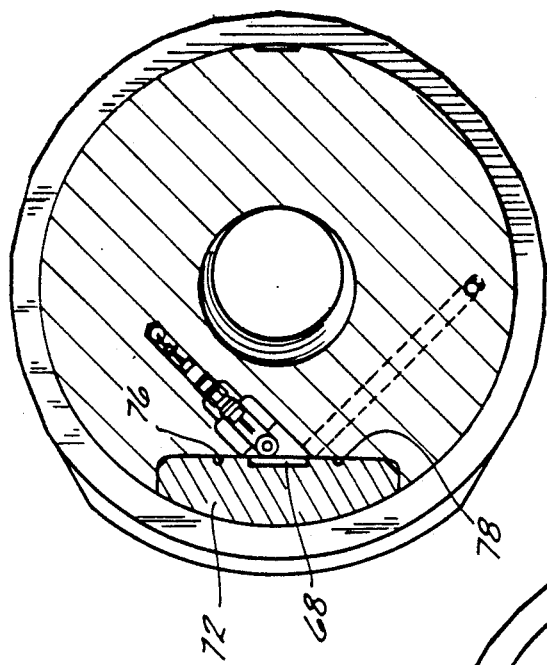
FIG. 10 is a cross sectional elevation view along the line 10—10 of FIG. 2.
Figure 11:
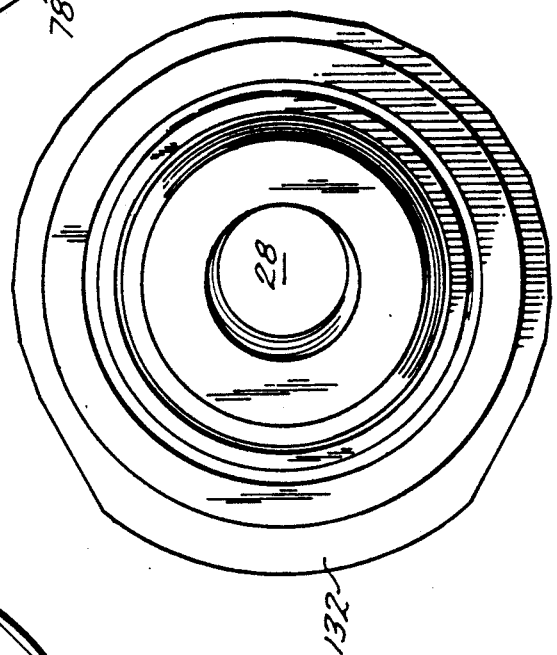
FIG. 11 is a right end view of the tool of FIG. 2.
Figure 9:
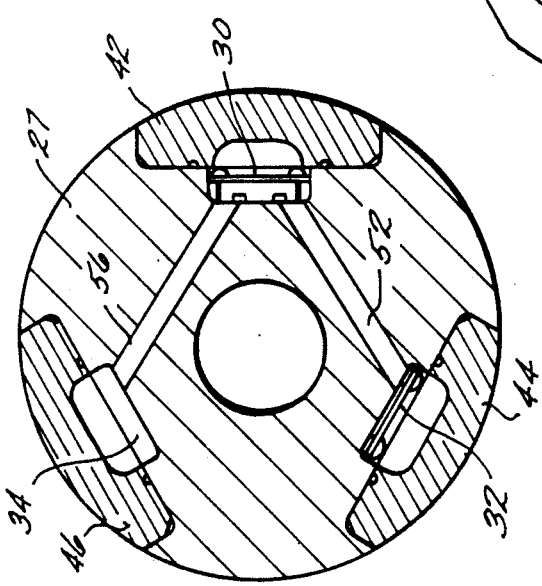
FIG. 9 is a cross sectional elevation view along the line 9—9 of FIG. 2.

Referring to FIGS. 2, 3, 6, 10 and 12, sub 27 also includes an uphole junction hatch 68 (FIGS. 2, 10 and 12) and a downhole junction hatch 70 (FIGS. 3, 4 and 12). As in the previously discussed hatches, each junction hatch 68, 70 is associated with a junction hatch cover 72, 74, respectively. Cover 72 utilizes an O-ring 76 to form a high pressure fluid tight seal with a flat surface 78 surrounding hatch 68 (FIG. 10). Similarly, junction hatch cover 74 utilizes an O-ring 80 to form a high pressure fluid tight seal with a flat surface 82 surrounding hatch 70 (FIG. 10). As will be discussed below, each junction hatch 68, 70 provides a chamber for effecting an electrical connection between the electronics disposed in hatches 30, 32 and 34 and a modular connector provided on either end of tool 10. In addition, each junction hatch 68, 70 serves as a pressure bulkhead so that in the event of a failure (e.g., leak) of the modular connector bus (described below), drilling fluid will be precluded from flowing into hatches 30, 32 or 34.

The thick walled sub 27 is the structural portion of tool 10 which transmits torque and weight to the lower portion of the drillstring. Mounting of the detector assemblies and other electronics within hatches 30, 32 and 34 under a removable high pressure hatch cover 42, 44 and 46, respectively provides many features and advantages including ease of installation and removal of components from within the hatches and ease of accessibility to the detectors and electronic components for diagnosis and adjustment. Also, the use of chambers 30, 32 and 34 permits the positioning of the detectors (identified at 12 and 14 in chamber 30 in FIG. 12) as close as possible to both the outside of the tool and formation wall.

As described in detail in the aforementioned pending patent applications, the nuclear logging tool 10 of this invention utilizes a bus which comprises a single wire (see item 84 in FIGS. 2 and 12) that runs the full length of the tool sub 27 through a longitudinal bore 86 (parallel to the centerline of the tool) and is used to supply both power and communications to all locations in the tool. A power return is established for the system by using the steel drill collar 27 (that composes the body of tool 10) as the common return path and system ground. A significant feature of tool 10 is its ability to be used in a modular system. The construction of sub 27 discussed above (including the power and communications bus 84 and hatches 30, 32 and 34) lends itself for use, not only as a gamma density device, but also in other applications such as a neutron porosity tool or other downhole MWD tools. Accordingly, each end of tool 10 is designed to create what is known as a "modular tool connector" and described in detail with reference to FIGS. 2, 11 and 11A-E, of the aforementioned pending patent applications. It will be appreciated that the MTI hatch 34 shown in FIG. 10 herein is substantially identical to the MTI hatch described and shown in FIGS. 4, 5 and 31 A-B of the aforementioned pending patent applications.

Figure 5:
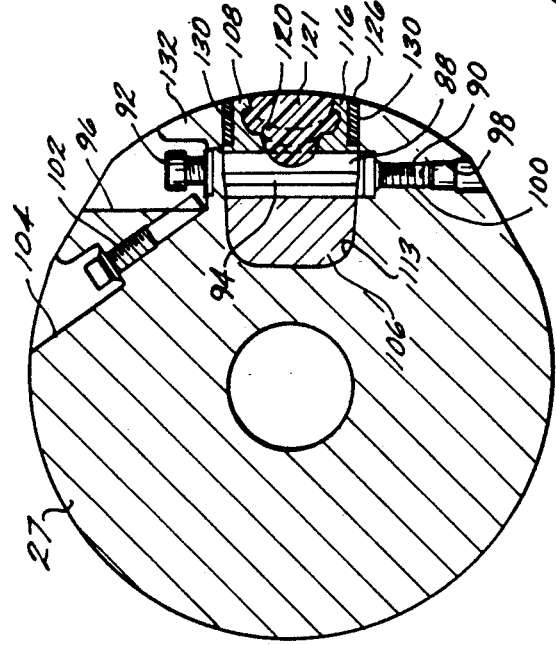
FIG. 5 is a cross sectional elevation view along the line 5—5 of FIG. 2.

Referring now to FIGS. 2 and 5, the nuclear source and the mounting thereof in tool 10 will now be described. The nuclear source container is shown generally at 88 in FIGS. 2 and 5. The source container is a rugged unit designed to withstand stresses, pressures and temperatures experienced in downhole oil drilling and is substantially identical in configuration to the nuclear source container depicted at 102 in FIG. 12 of the aforementioned patent applications. It houses a small NRC approved logging source such as cesium 137 and adapts it to large downhole hardware by means of a closely controlled diameter, length and thread 90 which secures source 88 to the logging tool and is located on the far right end of container 88. On the opposite end of the thread 88 is a bayonet 92 which is designed to engage and lock the source assembly into the receptacle of an installation and removal tool shown at 112 in FIGS. 14 and 14A of the aforementioned patent applications.

As best shown in FIG. 5, source 88 is mounted in an opening or pocket 94 through the subwall 27. Opening 94 is located tangentially to tool 10 so that the longitudinal centerline of the radioactive portion of nuclear source 88 will be positioned orthogonal to the longitudinal axis of tool 10 within a section of subwall 27. In this way, the centerline of source 88 will be in alignment or at least nominally (e.g., substantially) aligned with the axis of the detectors 14 and 16. Opening 94 includes a larger diameter portion 96 which is sized to receive the head of an installation and extraction tool and a smaller diameter section 98 having internal threading for threadable engagement with threaded end 100 of source 88. As a back-up measure, a bolt 102 is provided through an opening 104 (which runs from the outer wall of sub 12 and intersects opening 94) and abuts against the exterior end of source 88 for further securing retention in sub 27.

As is clear from FIG. 5, source 88 is secured such that it is open to the mud environment but not subjected to mud flow. The mounting of source 88 in subwall 27 allows for quick and easy removal from the tool, particularly in the event of an emergency. Also, the positioning of the source along the centerline of the tool provides optimal gamma-ray emission into the formation.

Surrounding source container 88 is a split gamma shield comprising a bottom shield 106 (FIGS. 13 and 14) and a top shield 108 (FIGS. 15-17). Splitting of the source shield provides a safety mechanism in the event of a failure of the source shield retainer 126. In such a failure, the relatively heavy top shield 108 will exit the tool leaving the source unstressed and intact within the subwall. Bottom source shield 106 comprises a rectangular block having rounded corners and has a semi-cylindrical channel 110 running through the width of an upper surface 112. Bottom shield 106 is bonded to a complimentary configured shaped recess 114 (see FIG. 5) in subwall 127. The need for an off-center bore 28 is easily shown in FIG. 5 in view of the deep recess 113 required for housing shields 106. Semi cylindrical channel 110 is shaped so as to receive and support the cylindrical outer housing of source container 88.

Upper or top shield 108 includes an inner base section 114 and a narrower extension section 116 (see FIGS. 15-17). Base section 114 includes a semi-cylindrical channel 118 which is sized to receive and support source container 88 in the same manner as channel 110. In addition, channel 118 is positioned in base 114 so that it will be coextensive with channel 110 when the upper shield 108 and lower shield 106 are mated as shown in FIG. 5. Extending through top shield 108 and communicating with channel 118 is a collimator 120 which diverges outwardly from channel 118. Collimator 120 has a generally conical configuration and has a diverging angle of about 40 degrees. A donut shaped groove 122 is formed laterally through concically shaped collimator 120 for the purpose of retaining a transparent window 121 therein. In addition, the groove 122 is eccentric to the centerline of the conically shaped collimator 120 to prevent rotation of the transparent window. It will be appreciated that the collimator is shaped and configured so as to optimally direct and focus gamma-rays from source container 88 into the formation in a manner in which the detector assemblies may optically detect returning signals. Collimator 120 is filled with a low Z material 124 having low density and high wear properties such as rubber or epoxy.

Both shields 106 and 108 are formed from a suitable gamma shield material such as tungsten, lead or spent uranium. Tungsten such as "Densalloy" manufactured by Teladyne Powder Alloys is preferred.

Top shield 108 is maintained in position by a source shield retainer 126 as best shown in FIG. 2. Shield retainer 126 is generally "T" shaped with a large rectangular central opening 128. As shown in FIG. 5, the depending sidewalls 130 of shield retainer 126 is configured to receive extension section 116 of top shield 108 and thereby retain top shield 108 in a predetermined position with respect to source 88 and subwall 27. Retainer 126 is threadably attached to subwall 27 using four bolts 132.

In accordance with another important feature of one embodiment of this invention, a rectangular area of sub 27 surrounding retainer 126 (and hence source container 88) is raised to define a fluid displacing lobe 132. Lobe 132 displaces drilling mud between sub 27 and the borehole wall thereby improving the density measurement (since the amount of drilling mud through which will pass gamma-rays from source 88 will be reduced to a minimum). Lobe 132 has a height which is fully gaged to the borehole being drilled. The lobe 132 is preferred for smaller diameter tools such as 6¾ inch tools. As will be discussed with regard to FIG. 2A, lobe 132 may be removed in larger diameter tools of 7¾ inch and above.

Figure 19:
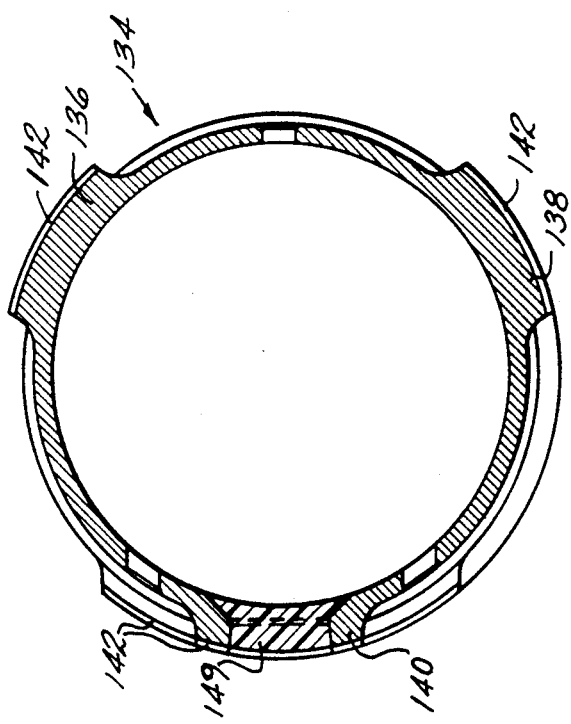
FIG. 19 is a cross sectional elevation view along the line 19—19 of FIG. 18.
Figure 22:
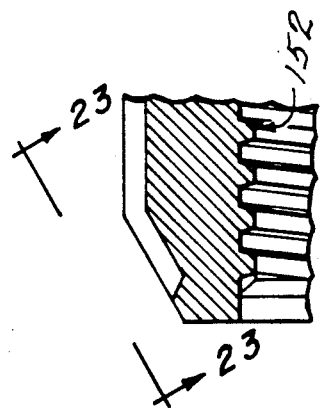
FIG. 22 is a cross sectional elevation view along the line 22—22 of FIG. 18.
Figure 23:
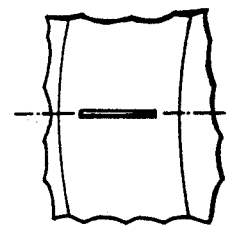
FIG. 23 is a plan view along the line 23—23 of FIG. 22.

With reference now to FIGS. 2, 6–8 and 18–23, in an effort to displace borehole fluids, reduce mud cake which might have an adverse effect on the measurement and maintain a relatively constant formation to detector distance, in accordance with an important feature of the present invention, a threaded on sleeve type fluid displacer 134 is threadably attached over sub 27 in an areas surrounding the three hatches and hatch covers and particularly the two windows 58 and 60 and hatch cover 42. The outer surface of sleeve 134 is provided with three blades 136, 138 and 140. As best shown in FIG. 6, when fully assembled, each blade 136, 138 and 140 will lie in a plane which is parallel to each hatch cover 42, 44, 46. Each blade 136, 138 and 140 may be formed in any number of known methods. Preferably, each blade is formed by machining the area between the blades as shown in FIG. 6 thereby leading to an uneven surface. Alternatively, the area between each blade may be machined so as to provide a smooth surface such as shown in FIG. 19. In a manner similar to lobe 132, each blade of sleeve 134 is fully gaged to the diameter of the borehole and provided with a hardened surface 142 on the outer edges thereof made from an appropriate material such as tungsten carbide. Each of blades 136 and 138 have a substantially rectangular planar configuration along the entire length thereof. However, blade 140 which extends over hatch cover 42 has a lower diverging section 144 (see FIG. 18) which is in alignment with lobe 132. Diverging section 144 has its largest width at a location closest to lobe 132 and the final width of diverging section 144 is approximately equal to lobe 132. It will be appreciated that the valley areas between each of blades 136, 138 and 140 are optimized so as to give adequate flow area for drilling fluid flowing through the annulus between the borehole wall and the density tool 10. A pair of openings 146, 148 are formed through blade 140 and are spaced from each other so as to be positioned over windows 58 and 60. It will be appreciated that opening 146 is substantially rectangular (with rounded corners) while opening 148 is slightly elongated or capsule shaped in configuration. Each window 146, 148 includes a low Z, low density, high wear filler material 149 such as the rubber or epoxy found in collimator 120. It will be appreciated that since the full force of the pressure drop is felt by the windows 58, 60 in hatch cover 42, the low Z material 149 in windows 146, 148 do not require the strength of the windows 58, 60. However, the material 149 in windows 146, 148 does require high wear resistance in view of the contact of the windows with the abrasive drilling mud and borehole wall.

Threading 150 on the outer surface of sub 27 (see FIG. 2) mates with threading 152 internally provided on sleeve 146 (see FIG. 22) for effecting the attachment of sleeve 136 to sub 27. The threads are a stub acme configuration and are capable of carrying substantial loads. The threads are not tapered and therefore any concern for matching pitch diameters of the two mating parts (sleeve 136, sub 27) is not present. The longitudinal positioning of sleeve 136 relative to sub 27 (and particularly the detector assemblies and source) is critical to the optimum performance of density tool 10. In a preferred embodiment, precise longitudinal positioning is established by locating the pitch diameter of a "key" thread on sleeve 136 located 0 degrees angularly from the center line of windows 146, 148. Similarly, a "key" thread on sub 27 is positioned relative to the detector assemblies. Using this method, when the sleeve 136 is installed on a sub 27 at the proper angular relationship, the longitudinal alignment is correct. Angular alignment to the source and detector assemblies is achieved by selecting the proper spacer (shown at 149 in FIG. 2) that will yield an acceptable "makeup" torque when in position. Torquing can be done with tongs or with a free standing torque machine. As shown in FIGS. 7, 8, 20 and 21, a key (e.g., rectangular insert 158) may be used to ensure, that the sleeve did not "makeup" downhole. This is accomplished by providing a rectangular opening 154 through sleeve 136. A bolt 156 is provided through a rectangular insert 158 which sits in a recess 160 in the wall of sub 27. Opening 154 is configured slightly larger than insert 158 so that a small gap 162 is provided. By measuring the gap, this "key" assembly may be used to insure that the sleeve 136 has not torqued up or down during use downhole. Still another important function of this "key" assembly is to insure that the stabilizer does not rotate beyond acceptable limits (which are defined by the gap 162). Thus, the "key" also functions as an anti-rotation device.

Each opening 146, 148 is provided with a spaced set of gage points 164, 166. Gage points 164, 166 are used to vent any drilling fluid between the inner diameter of sleeve 134 and the outer diameter of sub 27. Additionally, gage points 164, 166 are used to accurately locate a density tool calibration verifier (not shown).

It will be appreciated that the mandrel type fluid displacement sleeve 136 may be easily replaceable at the rig site when worn or damaged. The use of this sleeve therefore greatly extends the life of the density tool 10 by permitting easy and economical replacement of that section of tool 10 which is most likely to be damaged or worn during use. Moreover, the configuration and presence of the transparent windows 146, 148 work in tandem with the windows 58 and 60 to both reduce the attenuation of gamma-rays coming back from the formation as well as optimizing the response of the density tool assembly.

Referring now to FIG. 2A, an alternative fluid displacement sleeve 136' is shown. Sleeve 136' is preferred for larger tools having diameters of 7¾ inch and above. Sleeve 136' extends from over the several detector assemblies and hatch covers up to and over the area surrounding source shield retainer 126'. As a result, the raised lobe 132 is no longer necessary as sleeve 136' will perform the fluid displacment function of lobe 132. This may be important as lobe 132 is subject to wear and is difficult to repair (whereas sleeve 136' is easily replaceable when worn). Sleeve 136' is similar in all other respects to sleeve 136 except for an additional transparent window 161 which is positioned directly over source window 121'.

As discussed earlier, each detector assembly 12 and 14 is cradled by the earlier described shielding which partially surrounds each of the detector assemblies and precludes both backscatter from detected gamma-rays as well as any gamma-rays which travel directly from the source 88 through the tool towards the detector assemblies.

Figure 24:
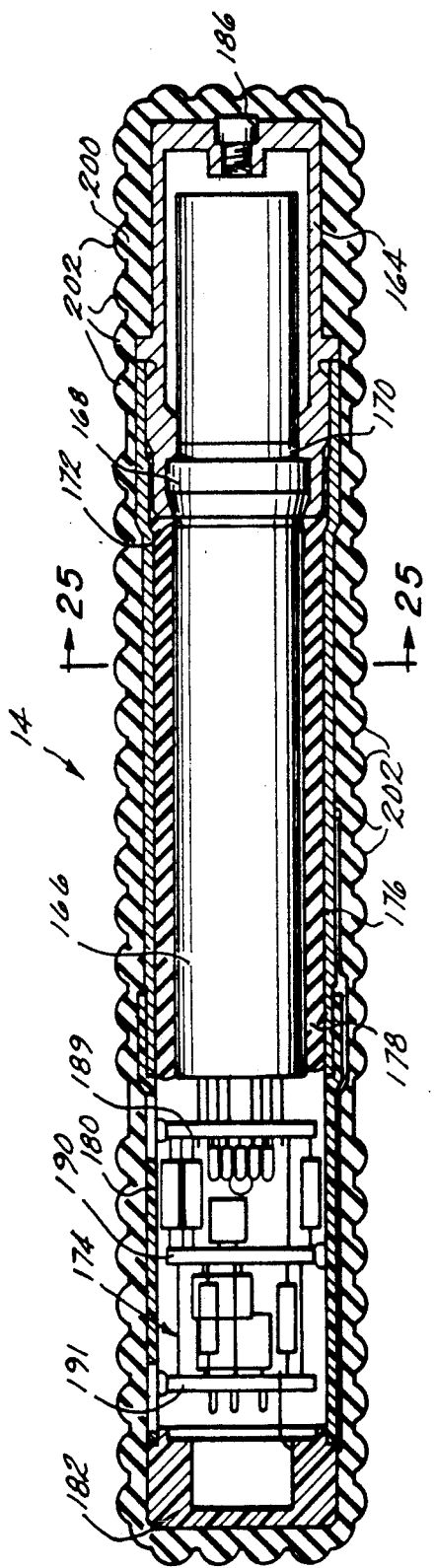
FIG. 24 is an elevation view, partly in cross section, of a detector assembly.
Figure 25:
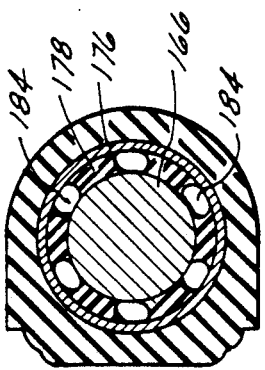
FIG. 25 is a cross sectional elevation view along the line 25—25 of FIG. 24.
Figure 26:
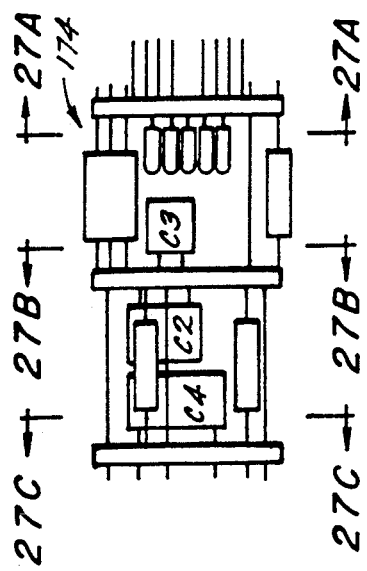
FIG. 26 is a side elevation schematic view of the dynode assembly shown in FIG. 24.
Figure 28:
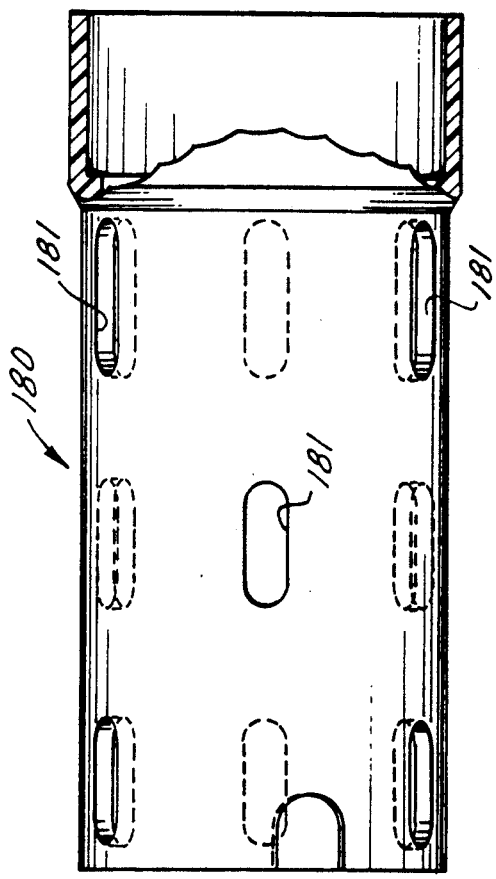
FIG. 28 is a side elevation view of the dynode assembly enclosure used in the detector assembly of FIG. 24.
Figure 27D:
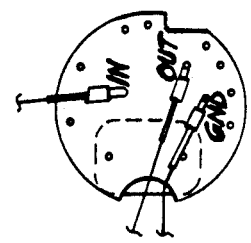
FIGS. 27A–D are schematic plan views taken along the lines 27A—27A, 27B—27B, 27C—27C, 27D—27D, respectively of the circuit boards employed in the dynode assembly of FIG. 26.
Figure 27C:
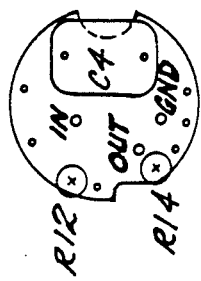
Figure 27B:
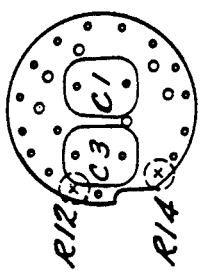
Figure 27A:
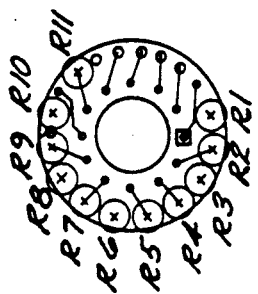

Turning now to FIGS. 24-26, the configuration of each detector assembly 12, 14 will now be described. Each detector assembly 12, 14 comprises a Commercially available housing 164 holding a crystal 163 (e.g., sodium iodide crystal) which optically communicates with glass phototube 166. The crystal is mounted in the hermetically sealed housing 164 using standard techniques. Housing 164 is attached to a glass window 168. The glass window 168 is then attached to crystal 103 via an optical interface of transparent silicone 170. In turn, glass window 168 is attached to phototube 166 using an adhesive 172 (preferably a silicone adhesive such as Silgard 184). A dynode assembly 174 electronically communicates with photomultiplier tube 166. Spaced from and surrounding photomultiplier tube 166 is a sleeve 176 made from a high permeability alloy such as a nickel/iron alloy (e.g., mu metal). Sleeve 176 provides magnetic protection for the phototube so as to avoid undesired disturbances in the tube output signal during operation. Tube 176 also serves as a structural member by protecting the glass photomultiplier tube from external forces such as those created by volumetric expansion of an elastomeric material 200 provided between sleeve 176 and the inner walls of the hatch and hatch cover. Sleeve 176 is threadably attached to housing 164 as shown in FIG. 24. On the opposed end from housing 164, sleeve 176 is slip fit and then bonded to a plastic enclosure 180 (see FIG. 28) which surrounds dynode structure 174 (FIG. 26). Plastic enclosure 180 includes a plurality of oblong openings 181 therethrough for the purpose of applying a bonding support such as RTV to secure circuit board 189, 191 to enclosure 180. Finally, an end cap 182 encloses the insulating tube 180. Tube 180, in combination with end cap 182, encloses and environmentally protects the dynode electronics assembly which is required for the phototube operation.

An elastomeric material 178 is provided in the space between magnetic shielding 176 and the phototube 166. This elastomeric material preferably comprises the material sold under the trademark ECCOSIL by Emerson and Cumming. Preferably, and with reference to FIG. 25, spaces 184 are formed in the elastomeric layer 178 so as to create an open space for expansion of elastomer 178 under elevated temperature conditions.

A small threaded radioactive "seed" source 186 is threadably received onto housing 164. Source 186 includes a fraction of a microcurie and is used to "seed" the source for a monitor peak. The dynode structure shown in FIG. 26 is comprised of three spaced circular circuit boards supporting a novel arrangement of resistors, capacitors, and other electronic components as schematically shown in FIGS. 27A-D. As diagrammatically shown in FIG. 27A-D, the dynode assembly includes a novel arrangement of the several resistors 188 in a circular arrangement laid out circumferentially between a pair of circular circuit boards 189, 190 with circuit board 189 (and resistors 1-11) being shown schematically in FIG. 27A. A third circular circuit 191 is spaced from and aligned with circuit boards 189, 190. This resistor arrangement is important as the space provided for the dynode assembly is small and therefore the electronic component arrangements provided is particularly advantageous. It will be appreciated that while the particular circular configuration of the dynode assembly is novel to this invention, the functional aspects of the dynode assembly are well known to those skilled in the art and so no further discussion thereof is deemed necessary.

The entire detector assembly 12, 14 is encapsulated in an outer layer 200 of potting material, preferably an elastomer (such as ECCOSIL) which has a specified geometry using a construction of molded ribs 202 to give the desired vibration characteristics. The result is the creation of a small, rugged package which can then be inserted within the hatch and the density tool sub wall without resorting to standard fasteners for mounting purposes.

Noise is a serious concern in MWD logging. The extreme vibration encountered in a drilling environment can produce noise in a number of detectors (e.g., He3 tubes and photomultiplier tubes). Thus, it would be extremely helpful to determine when noise occurs. To do this, the density tool of this invention breaks the observed energy spectrum into five regions. The lowest energy region is used for noise detection. The four higher energy regions are used to determine the density and Pe of the formation.

This allows for a downhole quality indicator for the density tool. As long as the count rate in the lowest region is within an acceptable range, noise is a minimal problem. When the count rate is above this range, one can assume vibration induced noise exists. Depending on the size of the observed noise, some or all of the remaining energy window data can be rejected. If the noise is just above the limits, only the next highest energy window is suspect. If the noise level is very high, all energy windows are suspect. In this manner, one can maximize the information obtained from the density tool while performing an essential quality control.

In view of the fact that the MWD density tool of this invention is typically used in conjunction with rotary drilling and will therefore be rotated (along with the rest of the drillstring) during measurement periods, there is a need to account for such rotations when evaluating the gamma ray measurements. In a first embodiment of this invention, a method known as "quadrature is used. In a second embodiment of this invention, the density measurement is combined with the measurement from a borehole caliper, preferably an acoustic caliper.

Quadrature is the breaking of the signal from the formation into four different sections: top, bottom, right, left. As the tool rotates, it will quickly pass through these four quadrants. Each time it passes a boundary, a counter is incremented, pointing to the next quadrant. This will allow for dividing the data into four spectra for each detector. Each of these four spectra will be obtained for $\frac{1}{4}$th of the total acquisition time (e.g., 30 second samples will result in four 7$\frac{1}{2}$ second acquisitions). The long space data, as well as the short space data, will have sufficient statistical significance for use in the measurement of the density. In this manner, four compensated density measurements can be obtained for each sample. These four measurements can be compared and/or combined to obtain an optimum density Pe, and pseudo-caliper measurement. The combination of measurements may be simple averages or a weighed average, the latter being described in the caliper-based technique shown in Table 2. If the borehole suffers minimal washout, all four compensated density measurements may be used in the calculation of the true density. If the borehole suffers more extensive washouts, the bottom and the two side measurements may be used to calculate true density. If the borehole suffers extreme washout, only the bottom measurement would be used.

A pseudo-caliper measurement can be obtained from the compensation measured in each one of the quadrants. For a given mud type and weight, there is an experimentally derived relationship between the amount of compensation measured by a density tool and the amount of the standoff observed. Since the mud weight is usually fairly well known, this will allow the calculation of the standoff in the four quadrants from the compensation in these quadrants. These four standoff measurements can then be combined with the tool size to obtain a two axis pseudo-caliper measurement.

Minimal, more extensive and extreme washouts will be defined in terms of the rib correction available to the density tool. Minimal washout utilizes a small rib correction and is easily made. As washout becomes more extensive, the rib correction becomes larger and the errors inherent in the application of the correction grow. The selection of one or more of these quadrants is dependent on the tradeoff between the error associated with the larger rib correction and the increase in statistical error associated with using only some of the data. The rib error is determined with experimental measurements in a well known fashion and will be unique for each logging tool. The statistical error is inversely proportional to the square root of the total counts used. In summary, the method of this invention minimizes error in formation data by:

(1) dividing a cross section of the borehole being logged in a plurality of sections (preferably four equal sections);

(2) receiving signals from the formation being logged while rotating the logging tool and dividing the received signals with respect to the selected borehole section from which the signals are received;

(3) determining a spectra for each of the selected sections;

(4) analyzing each of the determined spectra to determine the relative error in each spectra; and (5) minimizing the relative error by comparing the relative error in each spectra and by selecting a specific spectra or by combining at least two spectra.

It will be appreciated that the relative error is a combination of the rib error and the statistical error. The actual process for minimizing these error may be accomplished using commercially available function minimization routines such as is available from IMSL of Houston, Texas under the tradename UNLSF. With every improvement in available rib correction, the cutoffs for the use of four, three, and One quadrant will be extended. However, since field examples have shown a very wide range of washout boreholes, from near zero to several inches, quadrature will complement any rib response.

Figure 29:
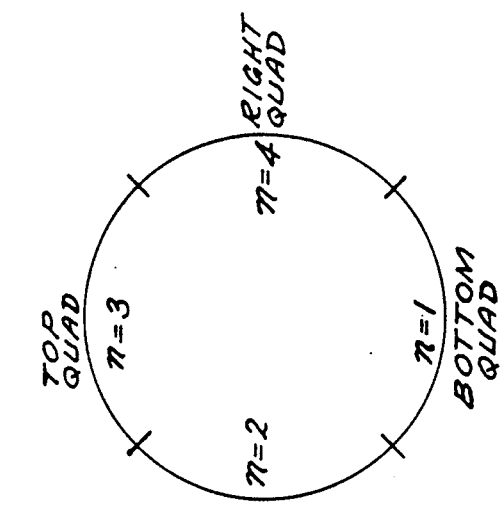
FIG. 29 is a schematic cross sectional view of the tool of FIG. 1 broken into four quadrants.

An important feature of this quadrature technique is to accurately break the borehole up into four quadrants (as schematically shown in FIG. 29). This can either be done with information supplied from measurements made within the density tool itself, or with information supplied through the communications bus 84 from another tool. Using information from within the density tool itself has the advantage of no load on the communications line. Four times per revolution, a signal comes from the quadrature detector and the bin pointer (n in FIG. 1) is incremented. At the end of the accumulation time, four short space spectra and four long space spectra are analyzed to obtain count rates in the regions of interest. These count rates will be stored for later processing. The same technique may be used for communications on the bus 84. Four times per revolution, a signal would be sent from an accelerometer or a magnetometer to the density tool. Since this signal would need to be in real time, it would have precedence over all other communications. Further, since drilling rotation rates are often in the range of 120 rpm, the information would have to be sent at a rate of approximately, 8 per second.

An alternative scheme is to send slightly different information at regularly scheduled intervals. Instead of sending information at variable times but exact revolutions, the communications bus could send information at regular intervals, but at variable total revolutions. For example, the total number of revolutions could be sent every half second. (This number could use clock arithmetic to minimize the number of bits needed). From this, the bin switching times for the next half second would be calculated. An example of this alternative is shown in Table 1.

TABLE 1

| Seconds | Revolutions | Quadrature Times |
|---------|-------------|------------------|
| 0.0     | 0.56        |                  |
| 0.5     | 1.36        | 0.595            |
|         |             | 0 753            |
|         |             | 0.911            |
| 1.0     | 2.10        | 1.100            |
|         |             | 1.267            |
|         |             | 1.433            |
| 1.5     | 2.98        | 1.511            |
|         |             | 1.653            |
|         |             | 1.795            |
| 2.0     | 3.70        | 2.035            |
|         |             | 2.208            |
|         |             | 2.382            |
| 2.5     | 4.55        | 2.617            |
|         |             | 2.765            |
|         |             | 2.912            |
| 3.0     | 0.33        | 3.109            |
|         |             | 3.269            |
|         |             | 3.429            |

In still another alternative scheme, a borehole caliper may be used to communicate with the density tool and divide the borehole into sections (e.g., quandrants) based on averaged stand-off in those sections. Preferred calipers are described hereinafter with regard to the second embodiment.

It will be appreciated that the above-discussed quadrature technique is equally applicable to a system which breaks down the density signal into less than four or greater than four sections.

In accordance with a second embodiment, the density measurement is combined with the measurement from a borehole caliper in order to account for the rotations of the density tools in evaluating measurements. The borehole caliper is preferably an acoustic borehole caliper associated with the drillstring such as described in U.S. Pat. Nos. 4,661,933, 4,665,511 and 4,867,264, all of which are incorporated herein by reference.

As mentioned, formation density measurements with gamma ray tools are best made when there is a minimum of standoff between the source and the detectors on one hand and the formation on the other. With wireline tools, the best possible indication of standoff is the compensation curve. However, the mechanical caliper that a wireline tool uses is often quite inaccurate. Further, it measures total borehole size, not standoff in front of the detector.

MWD applications offer a different type of environment. First, the tool is rotating. Thus, the detectors could see substantially different standoff at any given time. Thus, the correction curve, which is obtained from an average value, could not be used to determine the fraction of the revolution for which there is minimal standoff and the fraction for which there is substantial standoff. Second, the type of caliper used differs greatly from wireline to the MWD environment. Wireline tools use a mechanical caliper, which measures hole size along the axis of the caliper. In contrast, an acoustic caliper for MWD use will measure the standoff in front of it as frequently as 100 times/second. This presents a clear advantage when combined with a density measurement. The acoustic caliper can continuously measure the standoff as the tool is rotating around the borehole. If the caliper is aligned with the density source and detectors, it can determine the standoff in front of the detectors at any given time. This information can be used to separate the density data into a number of bins based on the amount of standoff.

After a pre-set time interval, the density measurement can then be made. The first step in this process is for short space and long space densities to be calculated from the data in each bin. Then, these density measurements can be combined in a manner that minimizes the total error in the density calculation.

Minimizing the errors in the density calculation requires the consideration of two main error sources: statistical fluctuations in the count rates and the increased uncertainty in the measurements associated with increased standoff. The magnitude of the statistical uncertainty is proportional to the square root of the inverse of the acquisition time. The increase in uncertainty with standoff is tool dependent and must be calculated for every tool. One can see how the tradeoff can be made by considering two examples. In the first example, shown in Table 2, the tool spends most of its time with minimal standoff between the density detectors and the formation. Thus, the best density measurement can be made by taking data from the first bin only. In the second example, shown in Table 3, the density tool has, for most of the time interval, more than minimal standoff. If only the minimal standoff data were used, the statistical uncertainty would be extremely high. For this reason, a weighed average of the first three bins is used as the final density. It can be seen that the weights for each bin, also shown in Table 3, relate to the acquisition time for each bin, but are not exactly proportional to this time. Rather, the weights reflect the reference for data from the first bins, where the error due to standoff is less.

TABLE 2

| Bin | Time | Weight |
| --- | --- | --- |
| 1 | 25 s | 1.0 |
| 2 | 4 s | 0.0 |
| 3 | 1 s | 0.0 |
| 4 | 0 s | 0.0 |

TABLE 2-continued

| Bin | Time | Weight |
| --- | --- | --- |
| All | 30 s | 1.0 |

TABLE 3

| Bin | Time | Weight |
| --- | --- | --- |
| 1 | 5 s | 0.4 |
| 2 | 10 s | 0.4 |
| 3 | 10 s | 0.2 |
| 4 | 5 s | 0.0 |
| All | 30 s | 1.0 |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of minimizing error in formation data from a borehole received by at least one detector assembly in a formation evaluation measurement-while-drilling (MWD) logging tool including the steps of:
   dividing a cross section of a borehole into a plurality of selected sections;
   receiving signals from said formation being logged while rotating the MWD logging tool and dividing the received signals with respect to the selected borehole section from which the signals are received;
   determining a spectra for each of said selected sections;
   analyzing each of said determined spectra to determine the relative error in each of said spectra; and
   minimizing said relative error by comparing the relative error in each spectra and by selecting a specific spectra or by combining at least two spectra.

2. The method of claim 1 wherein said borehole is divided into four sections defining quadrants.

3. The method of claim 1 wherein:
   said MWD logging tool comprises a gamma ray density tool.

4. The method of claim 1 wherein:
   said relative error is a combination of rib error and statistical error.

5. The method of claim 1 wherein said step of dividing the borehole comprises:
   using an accelerometer and/or magnetometer to determine position of the MWD logging tool in the borehole to derive a position signal with respect to time, said position signal being used to derive cross-sectional divisions of the borehole.

6. The method of claim 1 wherein said step of dividing the borehole comprises:
   using an accelerometer and/or a magnetometer to determine a boundary of a selected cross-sectional division of the borehole and sending a signal to the MWD logging tool that a boundary of a selected division has been crossed.

7. The method of claim 1 wherein said step of combining said spectra includes using weighed averages.

8. The method of claim 1 wherein said step of dividing the borehole comprises:
   using caliper means associated with the MWD logging tool to determine stand-off between the borehole and the MWD logging tool, the stand-off being used to determine cross-sectional divisions of the borehole.

9. The method of claim 1 including the step of:
determining compensated density measurements for each spectra.

10. The method of claim 1 including the step of:
determining the compensation measured for each spectra.

11. The method of claim 10 wherein drilling fluid flows between the formation and the MWD logging tool and including the step of:
using characteristics of the drilling fluid together with the measured compensation to derive stand-off measurements between the formation and MWD logging tool for each section.

12. The method of claim 11 including the step of:
combining the stand-off measurements to derive a pseudo-caliper measurement.

* * * * *